United States Patent

[11] 3,579,064

| [72] | Inventor | John R. Taylor |
| | | North Wales, Pa. |
| [21] | Appl. No. | 821,847 |
| [22] | Filed | May 5, 1969 |
| [45] | Patented | May 18, 1971 |
| [73] | Assignee | Sperry Rand Corporation |
| | | New York, N.Y. |

[54] SOLID-STATE MOTOR CONTROL CIRCUIT USING TRIAC ELEMENTS
9 Claims, 1 Drawing Fig.

| [52] | U.S. Cl. | 318/207, 318/227 |
| [51] | Int. Cl. | H02p 1/42 |
| [50] | Field of Search | 318/203, 207, 227 |

[56] References Cited
UNITED STATES PATENTS

| 3,421,063 | 1/1969 | Reinke | 318/227X |
| 3,432,736 | 3/1969 | Van Emden | 318/207X |
| 3,444,448 | 5/1969 | Welch | 318/207 |

*Primary Examiner*—Oris L. Rader
*Assistant Examiner*—Gene Z. Rubinson
*Attorneys*—Charles C. English, Rene A. Kuypers and Stanley B. Green

ABSTRACT: There is disclosed a solid-state control circuit which provides on/off, direction reversal and braking signals for a single-phase motor. The solid-state circuit utilizes a combination of semiconductors which gate AC and DC current through the motor windings in a manner to provide clockwise or counterclockwise shaft rotation as well as on/off and braking signals.

Patented May 18, 1971
3,579,064
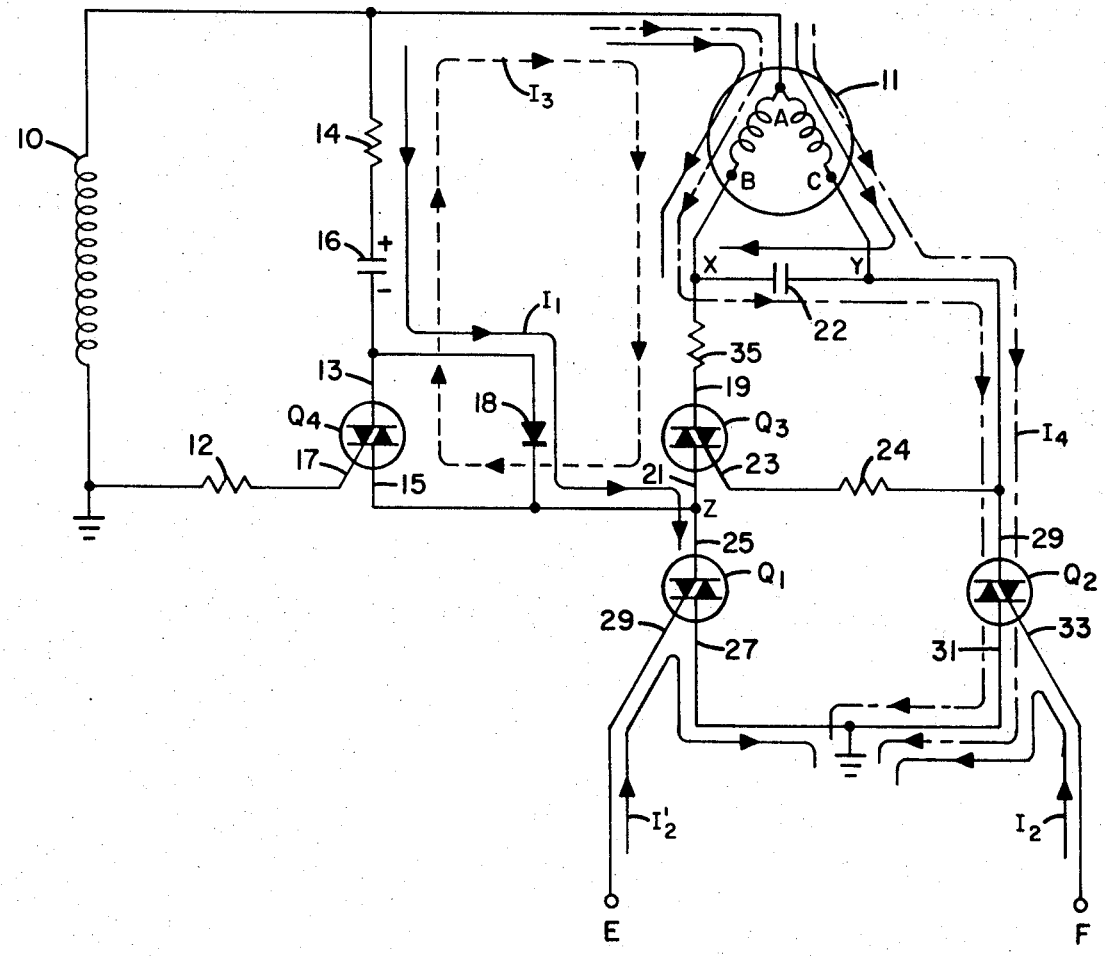
INVENTOR
*JOHN R. TAYLOR*
BY *Rene A. Kuypers*
ATTORNEY

SOLID-STATE MOTOR CONTROL CIRCUIT USING TRIAC ELEMENTS

BACKGROUND OF THE INVENTION

The instant invention is directed to the field of motor control circuits and in particular, the invention relates to solid-state motor control circuits.

In known prior-art motor control circuits for providing on/off, direction reversal and braking, it has been the practice to utilize combinations of relays and coupling transformers. Not only can it be said that relays and coupling transformers occupy a great deal of space but in addition relays at least are subject to frequent breakdowns because they have moving parts.

SUMMARY

Accordingly, there is disclosed a motor control circuit for use in a single-phase motor which utilizes solid-state triacs. The triacs are coupled to the motor and to an AC power source. A capacitor is also coupled to the power source and the motor. By gating-on certain combinations of the triacs, current is made to flow through the motor windings in such a manner that the shaft will rotate in one direction. When certain other combinations of triacs are energized by appropriate gating signals, the current flowing through the windings of the motor is such as to cause the shaft to rotate in an opposite direction. The motor is braked by causing the charge which is stored in the capacitor to discharge through only one of the windings of the motor as well as through certain combinations of the triacs. The semiconductor control circuit can be built at a low cost and with a minimum of space requirements. This latter improvement is significant in view of the modern-day trend towards miniaturization and low weight requirement.

BRIEF DESCRIPTION OF THE DRAWING

Referring now to the drawing, there is depicted the solid-state control circuit utilized with a single, split-phase motor.

DESCRIPTION OF THE PREFERRED EMBODIMENT

Referring now to the accompanying drawing in greater detail, there is depicted an AC power source 10 which is approximately 120 volts. This power source 10 is connected through various circuit components to the single-phase motor 11. The single-phase motor 11 is of the class known as a split-phase reversible type and comprises two windings A–B and A–C. Across the winding ends B–C is the capacitor 22. A split-phase motor is a single-phase induction motor equipped with an auxiliary winding in shunt with the main stator winding and differing from it in phase and spacing. In a reversible split-phase motor the auxiliary shunt winding may be either winding A–B or A–C depending upon whether motor shaft is rotating in a clockwise or counterclockwise direction. In other words, the current in winding A–B or A–C also flows through the capacitor 22 so that the current through that particular winding will actually lead the current in the other winding by a phase angle which is as much as 90°. Therefore, by exciting the two windings with currents out of phase, the magnetic field is made to rotate. The rotating magnetic field provided by these two windings induces eddy currents in the rotor so that the shaft moves in the direction of the field rotation. In effect, the split-phase motor operates in the same manner as a two-phase motor.

Connected to the point X are the two triacs $Q_1$ and $Q_3$ which are joined together in series fashion. The other end of the triac $Q_1$ is connected to ground potential. Another triac $Q_2$ is connected between point Y and ground potential. The gate electrode 23 of triac $Q_3$ is also connected to point Y via the resistor 24. The gate electrodes 29 and 33 of the respective triacs $Q_1$ and $Q_2$ are connected to the control terminals E and F. Another triac, $Q_4$, is connected to point Z and to the ungrounded side of AC power source 10 via the capacitor 16 and the resistor 14. The gate terminal 17 is connected to the grounded side of the power supply 10 via the resistor 12.

Triacs are semiconductor rectifiers in which both the forward and the reverse characteristics can be gated from the blocking state to the conducting state. It is sometimes described as a gated symmetrical switch. Whereas a single controlled rectifier can control only a rectified DC output, a triac can control AC power. A triac consists essentially of an NPNPN structure with a special gating system where, in general, gate current of either polarity can cause conduction of either polarity to begin. In other words, if a current flows through the gate electrode, a potential difference across the main terminals will cause current to flow therethrough. The arrangement can be considered as two silicon controlled rectifiers in parallel or an NPNP unit in parallel with a PNPN unit. Although sensitivity varies somewhat in the two conduction modes, nevertheless triacs are available where the difference is relatively small.

The description that follows will discuss the operation of the solid-state control circuit to enable the motor to operate in the forward direction. Let us assume that the uppermost portion of the power source 10 (i.e., the upper end of the coil) is AC of approximately 120 volts. Therefore, the voltage from point A of the motor 11 to ground potential is 120 volts AC. The voltage at the point Z is 120 volts since there is no current flowing in resistor 14, diode 18 or capacitor 16, nor as will be shown later, is there an initial charge on the capacitor 16.

A DC current is injected by applying a DC potential through a limiting resistor to the terminal E but terminal F remains at 0 volts. Accordingly, a DC current, $I'_2$, is established through the triac gating elements 29 and 27. No current flows through elements 31 and 33 since they are of the same potential. Since the anode 25 is at 120 volts AC triac $Q_1$ is conditioned to conduct (i.e., a potential difference is established across the terminals since terminal 27 is at ground and a gating current is present). Therefore, triac $Q_1$ conducts current from terminals 25 to 27 and point Z goes to ground.

Likewise, a gating signal from the 120-volt AC source is applied to the gate 23 via resistor 24 and the coil A–C of the motor 11. Accordingly, a potential difference exists across the gate terminals 21 and 23 and AC current flows from terminal 23 to 21 (i.e., terminal 23 is at 120 volts and terminal 21 is at ground). Furthermore, since a potential difference is established across terminals 19 and 21 (i.e., terminal 19 is at 120 volts and terminal 21 is at ground), triac $Q_3$ is also conditioned to conduct current. It should be realized that for the sake of clarity the conditioning of triacs $Q_1$ and $Q_3$ have been described as separate operations, however these events occur nearly simultaneously. Triac $Q_2$ is not conditioned to conduct even though there is a potential difference across terminals 29 and 31 since no gating current is present through the gate elements 31 and 33.

Therefore a complete circuit path has been established for the motor windings A–B and A–C from the power source 10 to ground via the triacs $Q_1$ and $Q_3$. This current is shown by the solid lines through the coil A–B and through the coil A–C and the capacitor 22 (i.e., from point Y to point X). This current flow through the main coil A–B and the shunt coil A–C establishes the desired revolving magnetic field in the motor stator in a direction so that the rotor follows in the desired forward direction.

As before noted, when triacs $Q_1$ and $Q_3$ conduct current, the point Z is at approximately ground potential. Hence, there is no potential difference across the gate circuit comprising terminals 15 and 17 since terminal 17 is also at ground potential and therefore, triac $Q_4$ is not conditioned to conduct.

A charging path is also established through the capacitor 16 at the same time the current is being conducted through the motor 11. Thus during the period that the AC voltage is more positive than the charge on the capacitor 16, the capacitor is being charged with a plus-minus polarity as shown. A charging path for the capacitor 16 is provided since the triac $Q_1$ is conducting and diode 18 is forward biased under the above conditions. As soon as the anode of the diode 18 rises slightly above ground (less than 1 volt), the charging current $I_1$ will be established to ground from the high side of the power source 10 via resistor 14, diode 18 and triac $Q_1$. The approximately 1 volt required to forward bias the diode 18 will be established during the first cycle of positive going AC voltage from the high side power source 10. In the initial period of the positive going AC voltage, the voltage across the capacitor 16 does not rise as fast as the source because of resistor 14 which limits charging current to a safe value based on the maximum allowable diode and/or triac current surge. As the AC voltage rises the voltage across the capacitor 16 increases until it almost approaches that of the power source peak 10. The charging current decreases as the capacitor voltage approaches peak line voltage. The charge current can flow only so long as the line is more positive than the capacitor. The capacitor 16 will not be completely charged during the first positive cycle of the power source 10 but will be very nearly completely charged after two or three positive cycles. The use of the charged capacitor 16 will be discussed below with regard to the braking circuit.

The following circuit operation will relate to the operation of the solid-state control circuit which causes the motor 11 to rotate in a reverse direction. Thus, to make the motor 11 rotate in the opposite direction, the function of the windings A–C and A–B is reversed. Thus, the winding A–C becomes the main winding and the winding A–B in conjunction with the capacitor 22 becomes the shunt winding.

To cause the motor 11 to operate in a reverse direction from that above described, two DC control signals are applied respectively to the terminals E and F. In the instant embodiment, both these control signals are the same magnitude and polarity and are in the range of 5 volts DC Accordingly, conduction paths $I_2$ and $I_2$, are developed in the gating circuits of the triacs $Q_1$ and $Q_2$, respectively. These currents flow from the respective terminals E and F to ground.

Assuming now that the upper portion of the AC supply voltage 10 is positive going, the anode 29 of triac $Q_2$ will also be positive since this voltage is applied through the coil A–C. Hence, the triac $Q_2$ conducts since the gate terminal is positive and a potential difference is developed across terminals 29 and 31. The AC current designated as $I_4$ flows through the coil A–C as well as through the coil A–B and through the capacitor 22 to ground via the triac $Q_2$. Since the coil A–B in conjunction with the capacitor 22 is now the shunt winding, the current therethrough leads the current through the coil A–C so that the rotating magnetic field now rotates in the opposite direction from that previously described. The rotor of the motor 11 will rotate oppositely since the rotor follows the oppositely rotating field in the stator.

A charging circuit is also provided for the capacitor 16 during the period that the motor 11 is rotating in the reverse direction. This charging path is the same as that previously described in discussing the operation when the motor runs in the forward direction. It will be recalled that triac $Q_1$ has a gating current $I_2$, flowing through terminals 29 and 27. The voltage at point Z therefore goes ground. As the instant charging begins, the instantaneous voltage drop will be nearly all across resistor 14 if the AC voltage is positive or across diode 18 if the AC voltage is negative. A small voltage of approximately 1 volt across the anode of diode 18 thereby forward biasing the latter. Hence, the charging path will exist through the capacitor 16, via the resistor 14, the diode 18 and triac $Q_1$ to ground.

In the above description it can be seen that when the motor 11 is run in either a forward or reverse direction, a charging path is established for the capacitor 16. Furthermore, the capacitor 16 is charged in a plus-minus direction as indicated on the drawing. The charge on the capacitor 16 provides dynamic braking for the motor 11 when the latter is running in either forward or reverse directions. This is demonstrated in the following manner.

To provide dynamic braking for the motor, the control voltages applied to the respective terminals E and F are returned to zero. Therefore, the triacs $Q_1$, $Q_2$ and $Q_3$ are turned off. Triacs $Q_1$ and $Q_2$ are turned off and no longer conduct when the control voltages are returned to zero and when the AC current next passes through zero. However, with the motor being turned off due to lack of conduction through the triacs, the motor will continue to rotate due to its inertia. The braking of the rotor occurs as follows.

The charge on the capacitor 16 has now reverse biased the diode 18. The reason for this is that with the capacitor 16 being fully charged, the negative terminal or the anode of the diode is no greater than zero volts if the positive terminal is at a peak positive voltage of 170 volts. Also, the cathode is at approximately 85 volts positive if the resistors 12 and 24 are equal since the full AC voltage is applied across the grounded side of the power source 10 and terminal A. Hence, diode 18 is back biased and the AC line voltage is effectively applied to the gates of $Q_3$ and $!_4$ firing both. In other words, terminal 23 is more positive than terminal 21 and terminal 15 is more positive than terminal 17 allowing gate current to flow from points A to ground via resistors 12 and 24 as well as through the above-mentioned gate terminals. Also, a potential difference is established across terminals 19 and 21 of triac $Q_3$ since the former is at full line voltage and the latter is at 85 volts as previously mentioned. In like manner, a difference of potential is established across terminals 13 and 15 since terminal 13 is at zero volts as above stated when the upper side of the supply 10 is positive and terminal 15 is at 85 volts. This voltage division establishes the capacitor or discharge path shown as $I_3$. This discharge current flows through the coil A–B of motor 11 through the resistors 14 and 35 as well as through the triacs $Q_3$ and $Q_4$. It should be noted that no discharge current flows through the diode 18 since it is back biased (i.e., the cathode is positive with respect to the anode).

The DC discharge current of the capacitor 16 provides the braking action for the motor 11. This discharge current provides braking by forming a stationary and momentary DC magnetic field in the stator coils and thereby causes the motor which follows the stator to brake quickly.

In summary, the following table shows which triacs are conducting under various conditions:

TABLE 1

|  | $Q_1$ | $Q_2$ | $Q_3$ | $Q_4$ |
| --- | --- | --- | --- | --- |
| RUN FORWARD | ON |  | ON |  |
| RUN BACKWARD | ON | ON |  |  |
| BRAKE |  |  | ON | ON |

I claim:
1. The combination comprising,
    a. a motor;
    b. electrical power means coupled to said motor;
    c. first and third semiconductor means further coupled to said motor and to said power means;
    d. means for simultaneously gating on said first and third semiconductor means; to enable said power means to rotate said motor in a first direction;
    e. second semiconductor means further coupled to said motor and to said power means;
    f. means for simultaneously gating on said first and second semiconductor means to enable said power means to rotate said motor in a second direction;
    g. fourth semiconductor means further coupled to said motor and to said power means;
    h. storage means coupled to said power source, motor and fourth semiconductor device;
    i. means for simultaneously gating on said third and fourth semiconductor means to enable a charge stored in said storage means to brake said motor.

2. The combination in accordance with claim 1 wherein said motor comprises a single-phased type.

3. The combination in accordance with claim 2 wherein said motor comprises a split-phase motor.

4. The combination in accordance with claim 1 wherein said first and third semiconductor means comprises respective first and third triac devices connected in series and further connected in series with the motor windings whereby the current flowing in said triacs and the motor windings causes the motor shaft to rotate in said first direction.

5. The combination in accordance with claim 1 wherein said second semiconductor device comprises a respective second triac device connected in series with the motor windings whereby the current flowing in said first and second triacs and the motor windings causes said motor shaft to rotate in said second direction.

6. The combination in accordance with claim 1 wherein said fourth semiconductor means comprises a respective fourth triac device connected in series relationship with at least one of the motor windings and said third triac device for conducting said stored charge through said one winding to cause the motor to stop rotating.

7. The combination comprising:
   a. a motor having first and second windings and a capacitor connected across said windings,
   b. first and second semiconductor devices connected in series relationship, one terminal of said first semiconductor device comprising said series connection being connected to one of said motor winding,
   and one terminal of said second semiconductor device comprising said series connection, being connected to ground potential,
   the gate electrode of said first semiconductor being coupled to one end of said second motor winding,
   the gate electrode of said second semiconductor being connected to a control signal,
   c. a third switching semiconductor device, one terminal being connected to said second motor winding and its second terminal being connected to ground,
   the gate electrode being connected to a second control signal,
   d. an AC power source, one side of which is at ground potential,
   e. a capacitor, one terminal thereof being coupled to the ungrounded side of said power source,
   f. a fourth semiconductor device, one terminal thereof being connected to the other side of said capacitor, and the second terminal being connected to the series connection between said first and second semiconductor,
   the gate terminal of said fourth semiconductor coupled to the grounded side of said power source,
   g. a diode connected across said terminals of said fourth semiconductor, whereby control signals applied to the gate terminals of said first and third semiconductor device causes said motor to rotate in a first direction, and a control signal applied only to the gate terminal of said first semiconductor device causes said motor to rotate in a second direction, and the removal of a control signal from the gate terminals of said first and third semiconductor devices causes the charge on said capacitor to discharge through said motor to cause the latter to come to a stop.

8. The combination in accordance with claim 6 wherein said motor is single-phased.

9. The combination in accordance with claim 7 wherein said motor is a split-phase type.